(12) United States Patent
Preimesberger et al.

(10) Patent No.: US 10,747,549 B2
(45) Date of Patent: Aug. 18, 2020

(54) PROXY APPLICATION TO TRANSFER APPLICATION PROTOCOL REQUESTS OVER IOCTL COMMANDS

(71) Applicant: HEWLETT PACKARD ENTERPRISE DEVELOPMENT LP, Houston, TX (US)

(72) Inventors: Lee A. Preimesberger, Houston, TX (US); Jorge Daniel Cisneros, Houston, TX (US); Thomas A. Schwartz, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 355 days.

(21) Appl. No.: 15/654,235

(22) Filed: Jul. 19, 2017

(65) Prior Publication Data
US 2019/0026125 A1    Jan. 24, 2019

(51) Int. Cl.
*G06F 9/445* (2018.01)
*G06F 8/61* (2018.01)
(Continued)

(52) U.S. Cl.
CPC ............ *G06F 9/44505* (2013.01); *G06F 8/61* (2013.01); *G06F 8/65* (2013.01); *H04L 41/082* (2013.01);
(Continued)

(58) Field of Classification Search
CPC ............... H04L 41/082; H04L 41/0853; H04L 67/2804; H04L 67/02; H04L 41/22;
(Continued)

(56) References Cited

U.S. PATENT DOCUMENTS 6,308,205 B1    10/2001  Carcerano et al.
8,370,748 B1 *  2/2013   Maity ................. H04L 41/0253
                                                         715/738
(Continued)

OTHER PUBLICATIONS

Unknown, "Monitoring and Managing Desktop CX Appliances With BMC", riverbed help, 2016, 1 page.

*Primary Examiner* — Charles E Anya
(74) *Attorney, Agent, or Firm* — Hewlett Packard Enterprise Patent Department

(57) ABSTRACT

A method disclosed herein relates to a proxy application that connects to an input/output controller (IOCTL) interface driver. The IOCTL interface driver transfers IOCTL commands to a baseboard management controller (BMC). The proxy application receives, through the IOCTL interface driver, an application protocol request over an IOCTL command from the BMC. The application protocol request includes a computing devices configuration, a computing devices configuration option, and user interface data. The proxy application also receives an update to the computing devices current configuration based on the computing devices configuration option. The proxy application generates a new application protocol request over the IOCTL command based on the update to the computing devices current configuration. The proxy application transmits, through the IOCTL interface driver, the new application protocol request over the IOCTL command to the BMC.

17 Claims, 3 Drawing Sheets

(51) Int. Cl.
*G06F 8/65* (2018.01)
*H04L 29/08* (2006.01)
*H04L 12/24* (2006.01)

(52) U.S. Cl.
CPC ...... *H04L 41/0853* (2013.01); *H04L 67/2804* (2013.01); *G06F 8/63* (2013.01); *H04L 41/22* (2013.01); *H04L 67/02* (2013.01); *H04L 67/36* (2013.01)

(58) Field of Classification Search
CPC ....... H04L 67/36; G06F 9/44505; G06F 8/61; G06F 8/65; G06F 8/63
See application file for complete search history.

(56) References Cited

U.S. PATENT DOCUMENTS

| | | | |
|---|---|---|---|
| 9,804,905 B1* | 10/2017 | Dunham | G06F 9/544 |
| 2006/0095551 A1* | 5/2006 | Leung | G06F 8/60 |
| | | | 709/223 |
| 2008/0263407 A1* | 10/2008 | Yamamoto | G06F 11/0712 |
| | | | 714/44 |
| 2009/0132799 A1* | 5/2009 | Brumley | G06F 9/44505 |
| | | | 713/100 |
| 2012/0131565 A1 | 5/2012 | Zhang | |
| 2014/0372745 A1 | 12/2014 | Yu | |
| 2015/0149989 A1* | 5/2015 | Lu | G06F 8/658 |
| | | | 717/170 |
| 2015/0178095 A1 | 6/2015 | Balakrishnan et al. | |
| 2017/0039060 A1* | 2/2017 | Brusky | G06F 9/06 |
| 2017/0052830 A1* | 2/2017 | Gambardella | H04L 65/80 |
| 2018/0032459 A1* | 2/2018 | Takahashi | G06F 13/10 |
| 2018/0077516 A1* | 3/2018 | Viswanathan | H04W 4/50 |
| 2018/0083834 A1* | 3/2018 | Rani | H04L 41/0213 |
| 2018/0101376 A1* | 4/2018 | Olarig | G06F 8/65 |
| 2018/0136946 A1* | 5/2018 | El-Haj-Mahmoud | G06F 9/4416 |
| 2018/0336042 A1* | 11/2018 | Rathineswaran | G06F 9/4406 |

* cited by examiner

PROXY APPLICATION TO TRANSFER APPLICATION PROTOCOL REQUESTS OVER IOCTL COMMANDS

BACKGROUND

Computing devices may include multiple options to configure and update the computing device. Such options may include various applications that are specific to different types of configurations. Examples may include multiple applications executing in the host operating system of the computing system. However, such applications are configuration specific and do not utilize the full capabilities of the baseboard management controller (BMC). The BMC may configure and update the computing device based on user input. However, such configuration and updates may require the computing device to be offline and the login to the BMC may require credentials physically printed on the computing devices chassis.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
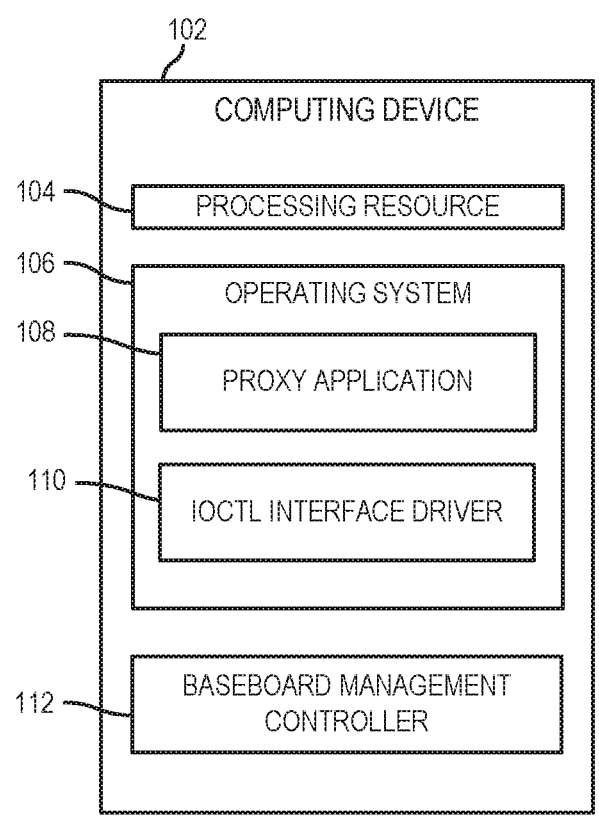
FIG. 1 is a block diagram of a computing device including a proxy application capable to translate and generate an application protocol request over an input/output controller (IOCTL), according to one example.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Computing devices may include multiple options to configure and update the computing device. Such options may include various applications that are specific to different types of configurations. Examples may include multiple applications executing in the host operating system of the computing system. However, such applications can be configuration specific and may not utilize the full capabilities of a baseboard management controller (BMC). The BMC may configure and update the computing device based on user input. However, such configuration and updates may require the computing device to be offline and the login to the BMC may require credentials physically printed on the computing devices chassis. For example, BMC configuration may require that the computing device is powered off. When a user powers on the computing device, the computing device may show a loading page before the operating system is loaded. A user may be able to press a specific key to log into the BMC configuration interface. A specific example may be pressing an F8 key when the computing device is in power on self-test (POST) to load the offline BMC interface. For the BMC credentials, an example may be a sticker on the top of the computing device chassis that lists the BMC username and password. In another example, a tag attached to the computing device lists the username and password. The location may change based on computing device model and generation. In some cases, a user may not have access to the physical server or may have difficulty in locating the username and credentials.

Currently, there are multiple, complex solutions. For instance, an application may be used to configure a redundant array of disks (RAID), while another separate application may be used to configure the BMC. Such applications may use different interfaces and programming languages. Further, some applications may only be used while the system is offline. There are numerous examples of individual applications that are specific to the configuration of one aspect of a computing device. As such, having the ability to configure and update a computing device with one application in the host operating system (OS) is advantageous. Such examples may not require the system to be connected to a network. Further, such examples may need administrator privileges to configure and update the computing system. Such examples may not need credentials, since the application may have administrator privileges. For applications with lower privileges, the application may request credentials, thus maintaining security.

Accordingly, various examples provided herein use a proxy application that executes at the OS level. The proxy application may connect to an input/output controller (IOCTL) interface driver that enables communication with a BMC. The examples include tunneling of application protocol requests over the IOCTL interface driver. The application protocol request may include a computing devices configuration, the computing devices configuration options, and user interface data. The proxy application may pass the application protocol request to a user interface. Configuration options may be selected in the user interface and passed, through the proxy application, to the BMC. The BMC may then configure the computing device based on the selected configuration options.

As shown in FIG. 1, a computing device 102 includes a processing resource 104, a BMC 112, and an OS 106. The OS 106 includes a proxy application 108 and an IOCTL interface driver 110. Said another way, the proxy application 108 and IOCTL interface driver 110 may execute at the OS 106 level. In such examples, the proxy application 108, IOCTL interface driver 110, and OS 106 are machine-readable instructions stored in a machine-readable storage medium. The processing resource 104 may execute the machine-readable instructions stored in the machine-readable storage medium. The proxy application 108 and IOCTL interface driver 110 may execute within the OS 106. Stated another way, the proxy application 108 and IOCTL driver 110 may execute when the OS 104 is executing.

The BMC 112 of FIG. 1 may send and receive IOCTL commands, process application protocol requests (e.g. a hypertext transfer protocol (HTTP) request), and configure the computing device 102 based on received configuration data. The proxy application 108 of FIG. 1 may, in response to a configuration selection, send an application protocol request (e.g. a HTTP request) over an IOCTL command to the BMC 112 through the IOCTL interface driver 110. The application protocol request (e.g. a HTTP request) may include configuration data based on the configuration selection. The proxy application 108 may also receive application protocol requests (e.g. a HTTP requests) over the IOCTL commands from the BMC 112 through the IOCTL interface driver 110. The application protocol request (e.g. a HTTP request) may comprise data to populate the user interface.

As used herein, a "computing device" may be a storage array, storage device, storage enclosure, server, desktop or laptop computer, computer cluster, node, partition, virtual machine, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

A "Baseboard Management Controller" or "BMC" is a specialized service processor that monitors the physical state of a server or other hardware using sensors and communicates with a management system through an independent "out-of-band" connection. The BMC may also communicate with applications executing at the OS level through the IOCTL interface driver. The BMC may have hardware level access to hardware devices located in a server chassis. The BMC may be able to directly modify the hardware devices. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for sub-systems of a computing device, and is separate from a processing resource that executes an OS of a computing device.

An "input/output controller interface driver" or "IOCTL interface driver" is a set of machine readable instructions that may be installed on the computing device. The IOCTL interface driver may execute in the kernel of the OS. Other machine-readable instructions executing in the user space of OS make calls to the IOCTL interface driver to send commands to the BMC. In other words, the IOCTL interface driver is the link between an application executing in the OS and the BMC. IOCTL commands may be sent over the IOCTL interface driver. An IOCTL command may include a data or payload section.

"Administrator privileges" is an operating level of an OS. Further, administrator privileges is the level of permissions that a user of the computing device may have. Administrator privilege implementation may vary between different OS's. Different OS's may have numerous levels of permissions. For example, one user may have full administrator privileges, while others may only have limited administrator privileges. In another example, a user's privilege level may be defined in an access control list. Applications may determine that a user is an administrator through checking the access control list. Other examples may only have two levels of permission, such as root access. A user may either have root access or not. Depending on the implementation and level of permission a user may have, a user may have permission to perform certain tasks that might otherwise not be available to a user with lower permissions.

Figure 2:
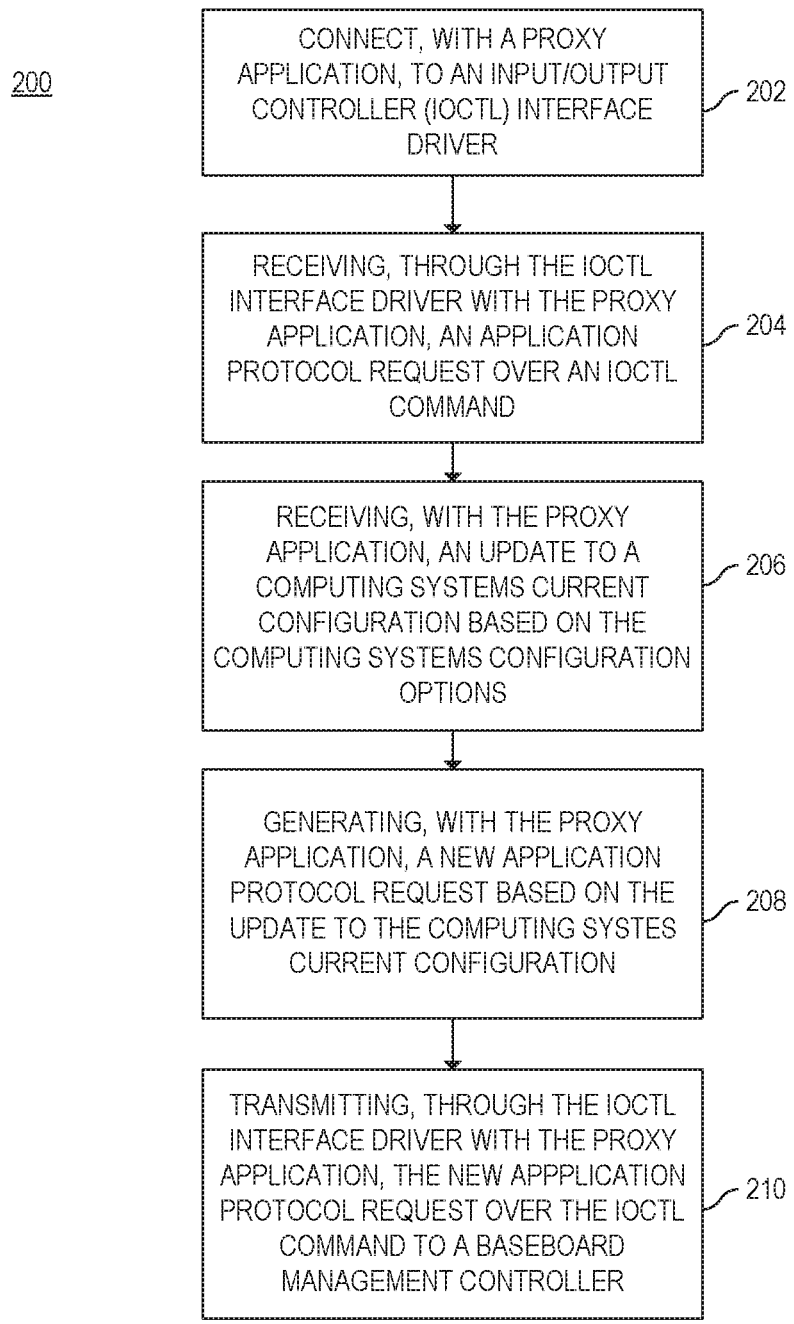
FIG. 2 is a flowchart of a method for receiving, generating, and transferring an application protocol request over an IOCTL command with a proxy application, according to an example.

A process 200, implementable in computing device 102 and other systems, is flow charted in FIG. 2. At block 202, a proxy application 108 may connect to an IOCTL interface driver 110. In an example, a user may execute or start the proxy application 108. Upon execution, the proxy application 108 may search for the IOCTL interface driver 110. Further, the IOCTL interface driver 110 may have a defined name. Once the proxy application 108 finds the IOCTL interface driver 110, the proxy application 108 may then connect to the IOCTL interface driver 110. The proxy application 108 may then transfer IOCTL commands to and from the IOCTL interface driver 110. Further, the IOCTL interface driver 110 may transfer IOCTL commands to and from a BMC 112.

At block 204, the proxy application 108, through the IOCTL interface driver 110, may receive an application protocol request over an IOCTL command from the BMC 112. Upon connecting to the IOCTL interface driver 110, the proxy application 108 may request user interface data to populate a user interface. In such examples, the request for user interface data may be an application protocol request over an IOCTL command sent through the IOCTL interface driver 110 to the BMC 112. The BMC 112, in response to the reception of the request for user interface data, may send user interface data to the proxy application 108 through the IOCTL interface driver 110. The BMC 112 may send the user interface data in the format of an application protocol request over an IOCTL command. The BMC may pull the user interface data from a web applet. The BMC may include the web applet. The application protocol request may also include the computing devices 102 configuration, the computing devices 102 configuration options, and user interface data. In an example, the application protocol request is an HTTP or hypertext transfer protocol secure (HTTPS) request.

At block 206, the proxy application 108 may receive an update to the computing devices 102 current configuration based on the computing devices 102 configuration options. In an example, the proxy application 108 may receive the update to the computing devices 102 current configuration from a user interface. The user interface may present the computing devices 102 configuration options. A user may select a configuration option. Upon a selection of a configuration option, the user interface may send the selection to the proxy application 108. In another example, the user interface may send the selection over a transmission control protocol (TCP) socket.

At block 208, the proxy application 108 may generate a new application protocol request over IOCTL command based on the update to the computing devices 102 current configuration. In an example, the proxy application 108 may receive the selection of the configuration option from a user interface. In such examples, the selection of the configuration option may be sent in the form of an application protocol request. Upon reception of the selection of the configuration option by the proxy application 108, the proxy application 108 may generate a new application protocol request over IOCTL command. The proxy application 108 may package the received selection of the configuration options (for example, in the form of an application protocol request) in an IOCTL commands data section.

At block 210, the proxy application 108, through the IOCTL interface driver 110, may transmit the new application protocol request over the IOCTL command to the BMC 112. In an example, once the new application protocol request over the IOCTL command is generated by the proxy application 108, the proxy application 108 may transmit the new application protocol request over the IOCTL command to the BMC through IOCTL interface driver 110.

The process 200 may include further steps. As described above, the proxy application 108 receives an application protocol request over the IOCTL command. The proxy application 108 may then translate the application protocol request over the IOCTL command to an application protocol request. The IOCTL command may store the application protocol request in a data or payload section of the IOCTL command. The proxy application 108 may translate the application protocol request by unpacking the data or payload section of the IOCTL command. The proxy application 102 may then send the application protocol request to a user interface. The proxy application 102 may send the application protocol request over a TCP socket.

As described above, the application protocol request may include the computing devices 102 configuration, the computing devices 102 configuration options, and user interface data. Based on the user interface data, the user interface may present the computing devices 102 configuration and the computing devices 102 configuration options. In an example, the user interface may be an internet browser. In another example, the user interface may be a graphical user interface (GUI). In an example, the application protocol request is a HTTP request. In another example, the application protocol request is a HTTPS request.

As described above, the proxy application 108 may send a new application protocol request over the IOCTL command to the BMC 112. In response to the reception of an application protocol request over the IOCTL command, the BMC 112 may translate the application protocol request over the IOCTL command to an application protocol request. In an example, the BMC 112 may include a representational state transfer (REST) web service. The REST web service may process the application protocol request. Depending on the data that the application protocol request may contain, the REST web service may update or configure the computing device. The REST web service may also queue an update or configuration, which may be processed by another component, other than the BMC 112, at a later specified time.

As described above, the proxy application 108 may connect to an IOCTL interface driver 110, the IOCTL interface driver 110 enabling communication with a BMC 112. In another example, the proxy application 110 may connect to a REST interface, the REST interface enabling communication with the BMC 112. In other examples, the proxy application 108 may connect to the BMC 112 over a TCP socket or other network protocols (such as HTTPS or secure socket layer (SSL)). As stated above, the REST interface may enable communication between the BMC 112 and applications executing in the OS, such as the proxy application 108. Further, the proxy application 108 may connect to the BMC 112 using a virtual IP address, local IP address, or pseudo-file system. The proxy application 108 may communicate with the BMC 112 using various types of commands other than IOCTL commands, such as REST commands or calls.

Figure 3:
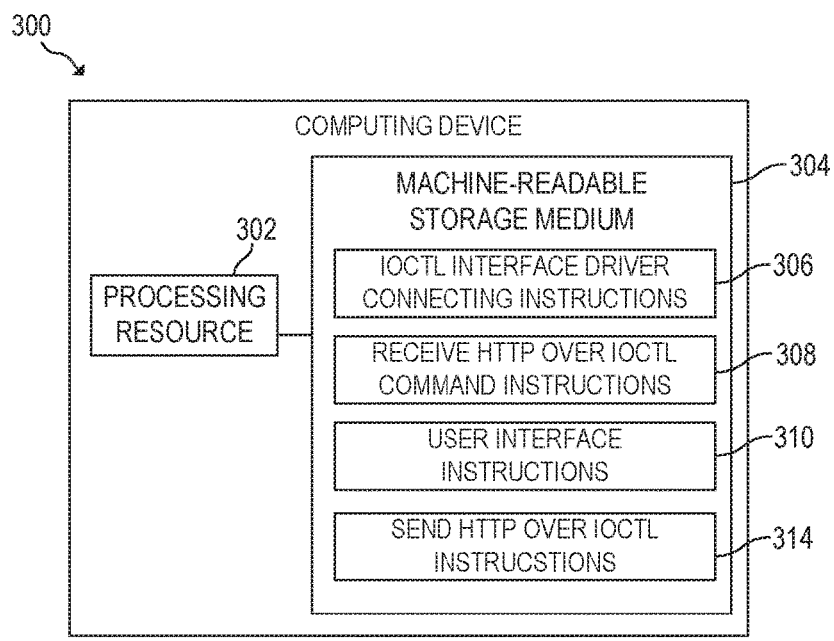
FIG. 3 is a block diagram of a computing device capable of receiving, generating, and transferring a hypertext transfer protocol (HTTP) request over an IOCTL command, according to an example.

FIG. 3 is a block diagram of a computing device including a proxy application capable to translate and generate a HTTP request over an IOCTL. As noted, the IOCTL interface driver may enable communication between the BMC and applications executing at the OS level. The processing resource 302 can execute IOCTL interface driver connecting instructions 306 to enable communication between the proxy application and the BMC. In some examples, the proxy application may connect to the IOCTL interface driver, when the proxy application executes at an administrator level. In other examples, the proxy application may connect to the IOCTL interface driver after a user provides credentials. In other examples, since the proxy application is executing at the administrator level, no credentials may be requested. Once the proxy application connects to the IOCTL interface driver, the proxy application may communicate with the BMC. The communication between the proxy application and the BMC may consist of IOCTL commands.

As noted, the proxy application may receive an application protocol request (e.g. HTTP request) over an IOCTL command. The processing resource 302 can execute instructions upon receiving the HTTP request over the IOCTL command 308. The instructions may translate the HTTP request over the IOCTL command. In an example, the IOCTL commands data section stores the HTTP request. The translation process may involve unpacking the data section of the IOCTL command. The result of the translation process is the HTTP request.

As noted, the proxy application may also connect to a user interface. The user interface may present a list of the computing devices configuration and the options related to the configurations. A configuration update may be selected in the user interface. The processing resource 302 may execute user interface instructions 310. Once the proxy application translates the HTTP request over the IOCTL command to an HTTP request, the proxy application may send the HTTP request over a TCP socket to the user interface. The user interface, as noted above, may be an internet browser. The internet browser may be a default internet browser of the OS. In another example, upon initial execution of the proxy application, the user interface is opened. In another example, the user interface data is from the BMCs web applet. In one example, a user may log into the BMC's user interface remotely. The BMC populates the user interface using the web applet. The web applet generates the HTTP requests to populate the user interface. In the example of the proxy application, the BMC packages the HTTP requests, which contain the user interface data, from the web applet into an IOCTL command. Upon translation of the IOCTL command into a HTTP request, the HTTP request is sent to the user interface. Thus, the user interface is populated with the web applet data. In another example, the user interface data is data to populate a web page (e.g. hypertext markup language (HTML)).

As described above, the user interface may include user interface data from the BMC. This user interface data may include computing device configuration options. The configuration options may include various types of configurations. For example, the computing device configuration options may include BMC configuration options, redundant array of independent disk (RAID) configuration options, machine-readable instruction (for example, software and firmware) updates, and OS imaging options. Other options may include memory configuration, network interface card (NIC) partitioning, virtual NIC configuration, and non-volatile dual in line memory module (DIMM) configuration. Further, for OS imaging options, the user interface may present a list of OS's for installation and a time at which to execute the image. In such an example, once the OS image is selected, at the time that is selected to execute the image, the BMC may shutdown the system and queue the OS installation. Once offline, the BMC may prompt a separate component capable of imaging the system to re-image the system (as in, install another OS). In another example, the BMC executes online configurations. In other examples, the BMC may restart the system, for the configurations to take effect.

As noted, the proxy application may send HTTP over IOCTL commands. The processing resource 302 can execute instructions to send HTTP over IOCTL commands 314. Upon selection of a configuration option in the user interface, the corresponding configuration update is sent to the proxy application in the form of a HTTP request. The proxy application may generate an IOCTL command, in response to the HTTP request. The proxy application may then package the HTTP request in the data section of the IOCTL command. Once the IOCTL command is generated and the HTTP request packaged in the IOCTL command, the HTTP request over the IOCTL command is sent to the BMC.

Figure 4:
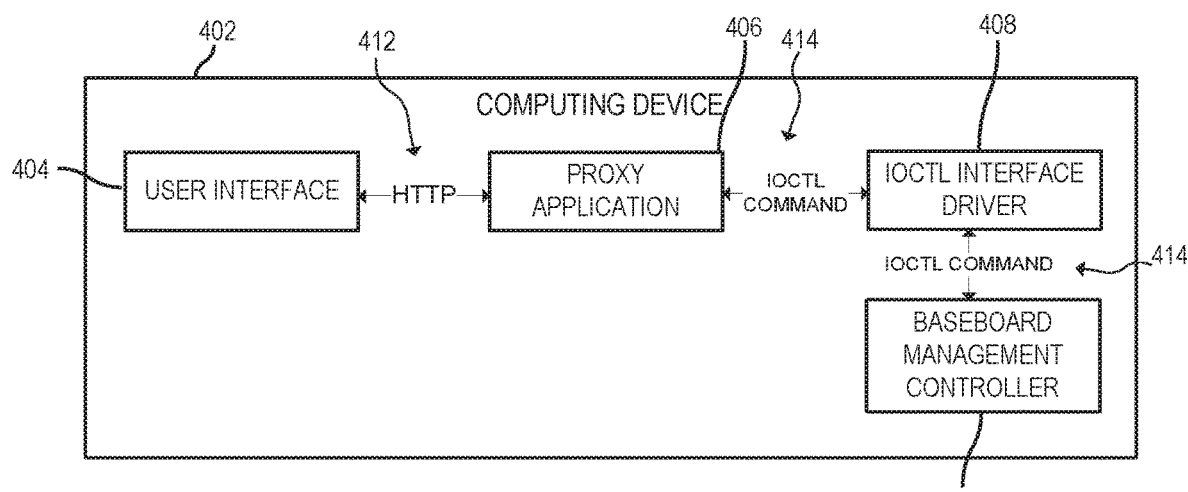
FIG. 4 is a block diagram of a computing device including a proxy application capable to translate and generate a HTTP request over an IOCTL, according to one example.

FIG. 4 is a block diagram of a computing device including a proxy application capable to translate and generate a HTTP request over an IOCTL, according to one example. In an example, a user interface 404 communicates with a proxy application 406. The user interface may send and receive HTTP requests 412 to and from the proxy application 406. A TCP socket may connect the user interface 404 and proxy application 406. The user interface 404 may generate a HTTP request 412 in response to a configuration option selection. The proxy application 406 may populate the user interface 404 with user interface data from the BMC 410. In a further example, the user interface data comes from a web applet in the BMC 410. In such examples, the BMC 410 may package the user interface data (as an HTTP request 412) in an IOCTL command 414. The BMC 410 may then send the IOCTL command 414 to the proxy application 406. The proxy application 406 may then translate the IOCTL command 414 and send the HTTP request 412 to the user interface 404. In another example, the user interface 404 may prompt a log in, before presenting configuration data and configuration options. In another example, the user interface 404 may not prompt a log in.

In another example, the proxy application 406 may send and receive HTTP requests 412 to and from the user interface 404. The proxy application 406 may also send and receive IOCTL commands 414 to and from the BMC 412 through an IOCTL interface driver 408. The IOCTL interface driver 408, as described above, may enable communication between the proxy application 406 and BMC 410. In an example, upon reception of an HTTP request 412, the proxy application 406 may package the HTTP request 412 in the data section of an IOCTL command 414. The proxy may then transfer the IOCTL command 414 to the BMC 410 through the IOCTL interface driver 408. In another example, upon reception of an IOCTL command 414 from the BMC 410, the proxy application 406 may translate the IOCTL command 414 into a HTTP request 412. The proxy application 412 may unpack the HTTP request 412 from the data section of the IOCTL command 414 (thus translating the IOCTL command 414). The proxy application 406 may then transfer the HTTP request 412 to the user interface 404.

In another example, the proxy application 406 is a machine-readable instruction. The proxy application 406 may be a small application. In other words, the proxy application 406 may utilize a small amount of resources of the computing device 402. A user may install the proxy application 406 at any time after the computing device 402 has been initialized. A user may initialize the computing device 402 by installing an OS and the necessary machine-readable instructions (e.g. drivers and firmware). In another example, the proxy application 406 is, by default, part of the machine-readable instructions to be installed with the OS. The OS may present the proxy application 406 as a desktop icon or in a list of installed applications. When the user selects the proxy application 406, the proxy application 406 may call the default internet browser of the OS and send the user interface data to the internet browser.

In another example, the computing device 402 is not connected to a network. The OS may present the user interface. A user may configure or update the computing device 402 while the OS is executing and not connected to a network, the proxy application 406 populating the user interface 404 with user interface data from the BMC 410. While a network connection is not necessary, the computing device 402 may connect to a network.

Although the flow diagram of FIG. 2 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A method of using a proxy application to transfer application protocol requests over input/output controller (IOCTL) interface driver commands, the method comprising:
    connecting, with the proxy application, to an input/output controller (IOCTL) interface driver, wherein the IOCTL interface driver transfers IOCTL commands to a baseboard management controller (BMC);

receiving, through the IOCTL interface driver with the proxy application, an application protocol request over an IOCTL command, wherein the application protocol request includes a computing devices configuration, a computing devices configuration option, and user interface data from the BMC; receiving, with the proxy application, an update to the computing devices current configuration based on the computing devices configuration option; generating, with the proxy application, a new application protocol request over the IOCTL command based on the update to the computing devices current configuration;

transmitting, through the IOCTL interface driver with the proxy application, the new application protocol request over the IOCTL command to the BMC;

translating, with the proxy application, the application protocol request over the IOCTL command to the application protocol request;

sending, with the proxy application, the application protocol request to a user interface; and presenting, with the user interface, the computing devices configuration and the computing devices configuration options based on the user interface data.

2. The method of claim 1, wherein the user interface is an internet browser.

3. The method of claim 1, further comprising:

translating, with the BMC, the new application protocol request over the IOCTL command to the new application protocol request;

configuring, with the BMC, the computing device based on the new application protocol request.

4. The method of claim 1, wherein the IOCTL interface driver is a machine readable instruction executed at an operating system (OS) level of the computing device.

5. The method of claim 4, wherein the proxy application is executed with administrator privileges.

6. The method of claim 1, wherein the application protocol request is a hypertext transfer protocol (HTTP) request.

7. A system for using a proxy application to transfer application protocol request over input/output controller (IOCTL) interface driver commands, the system comprising:

a processing resource;
an operating system (OS);
an input/output controller (IOCTL) interface driver;
a baseboard management controller (BMC), wherein the IOCTL interface driver enables the BMC to communicate with OS level applications with administrator privilege, to:
  receive and send IOCTL commands;
  process HTTP requests;
  configure the system based on configuration data;
  in response to a reception of an IOCTL command, determine whether the IOCTL command includes an HTTP request in a data section of the IOCTL command;
in response to a determination that the data section of the IOCTL command contains a HTTP request, transfer the HTTP request to the REST web service; and
wherein the proxy application executes at an OS level with administrator privilege, to:

in response to a configuration selection from a user interface,
send HTTP requests over an IOCTL command to the BMC through the IOCTL interface driver, wherein sent HTTP requests include configuration data based on the configuration selection; and
receive HTTP requests over the IOCTL command from the BMC through the IOCTL interface driver, wherein received HTTP requests comprise data to populate the user interface.

8. The system of claim 7, wherein the BMC includes a representational state transfer (REST) web service to process the HTTP requests.

9. The system of claim 7, wherein the user interface is a default internet browser of the OS.

10. The system of claim 7, wherein the configuration selection includes a queue for OS reinstallation.

11. The system of claim 7, wherein the configuration selection includes a queue for installations to complete at a later time.

12. The system of claim 7, wherein the configuration selection occurs while the system is online.

13. The system of claim 7, wherein the system is not connected to a network.

14. A non-transitory machine-readable storage medium encoded with instructions executable by a processor by using a proxy application to transfer application protocol requests over input/output controller (IOCTL) interface driver commands, the machine-readable storage medium comprising:

instructions to connect to an input/output controller (IOCTL) interface driver, wherein the IOCTL interface driver enables communication with a baseboard management controller (BMC);
instructions to receive hypertext transfer protocol (HTTP) messages over an IOCTL command from the BMC through the IOCTL interface driver;
instructions to populate a user interface based on the received HTTP messages;
instructions to receive a system configuration selection; and
in response to receipt of the system configuration selection, by the proxy application, instructions to create a new HTTP message over an IOCTL command and send the new HTTP messages over an IOCTL command to the BMC, wherein the new HTTP messages include a system configuration request based on the system configuration selection.

15. The non-transitory machine-readable storage medium of claim 14, wherein the system configuration selection includes at least one of: a redundant array of independent disk (RAID) configuration, BMC configuration, machine-readable instruction update installations, and operating system re-imaging.

16. The non-transitory machine-readable storage medium of claim 14, wherein the instructions are executed by the processor with administrator privileges.

17. The non-transitory machine-readable storage medium of claim 14, wherein the instructions do not include instructions to request a user credentials.

* * * * *